//

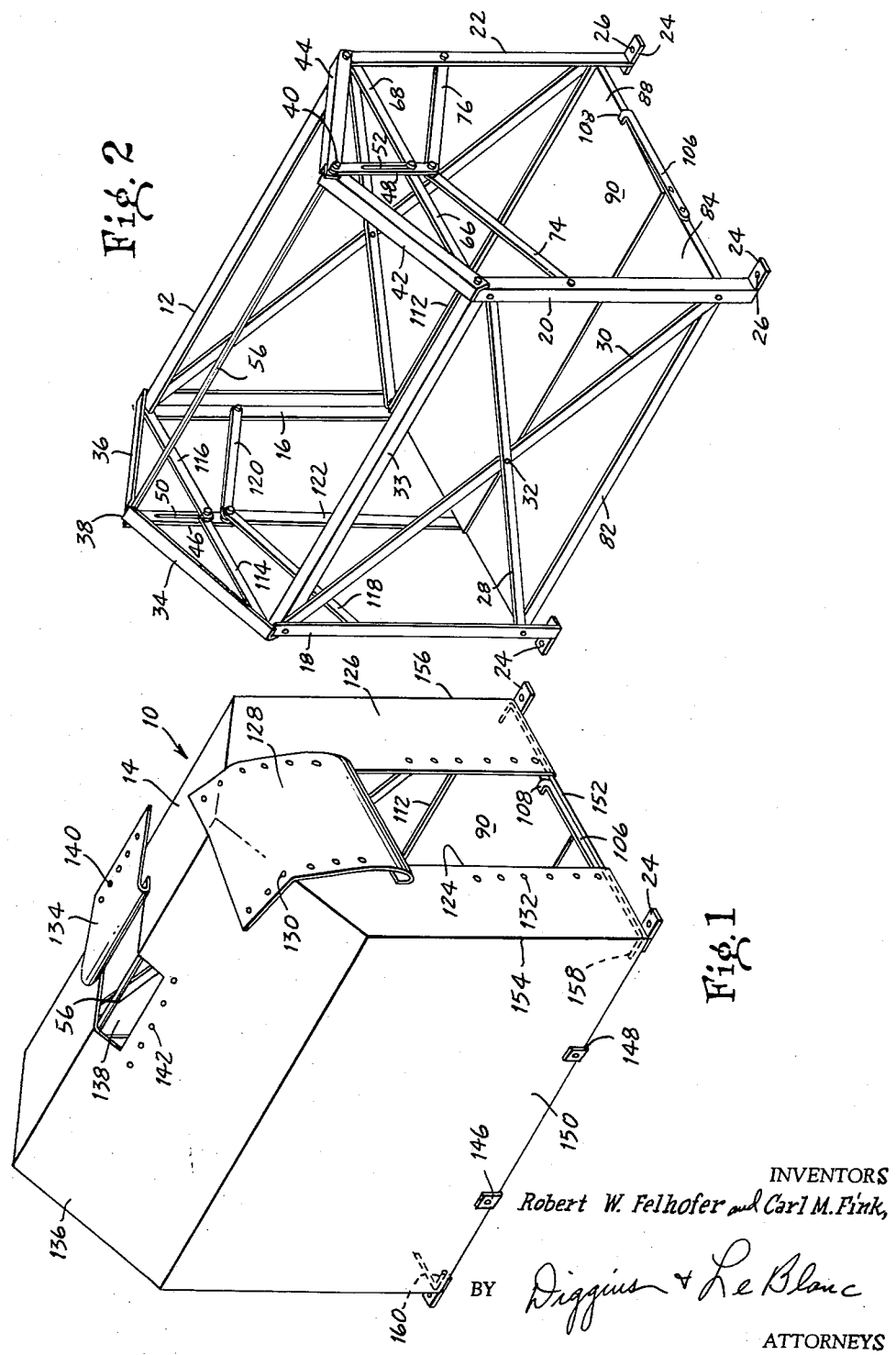

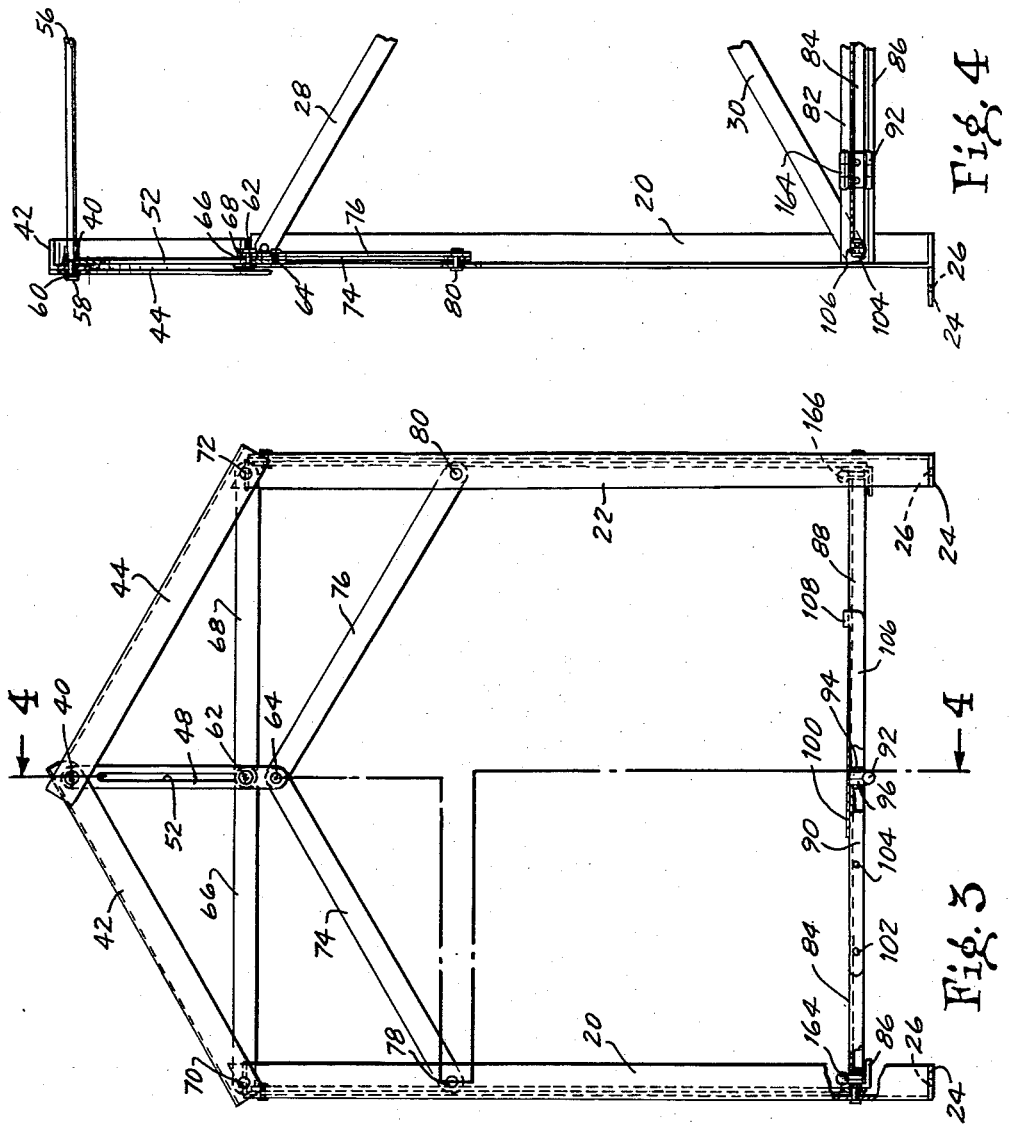

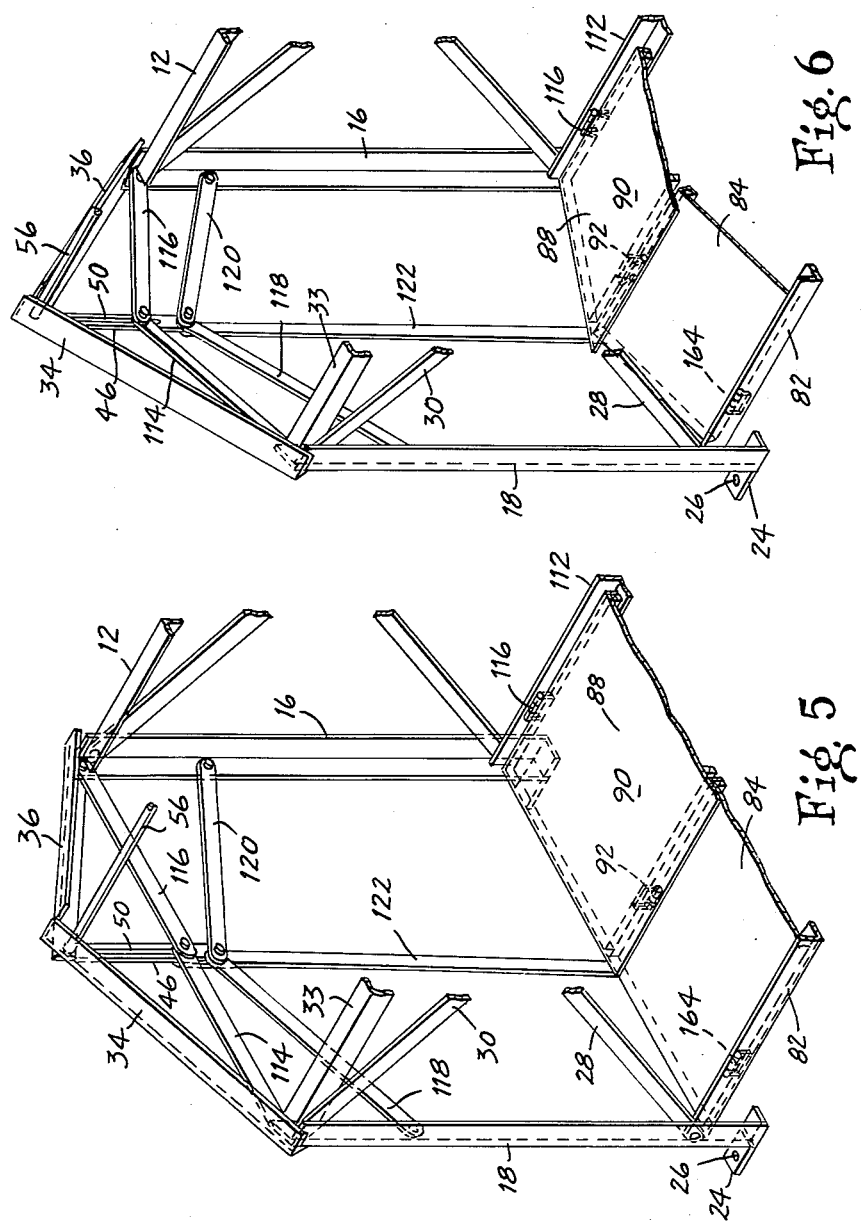

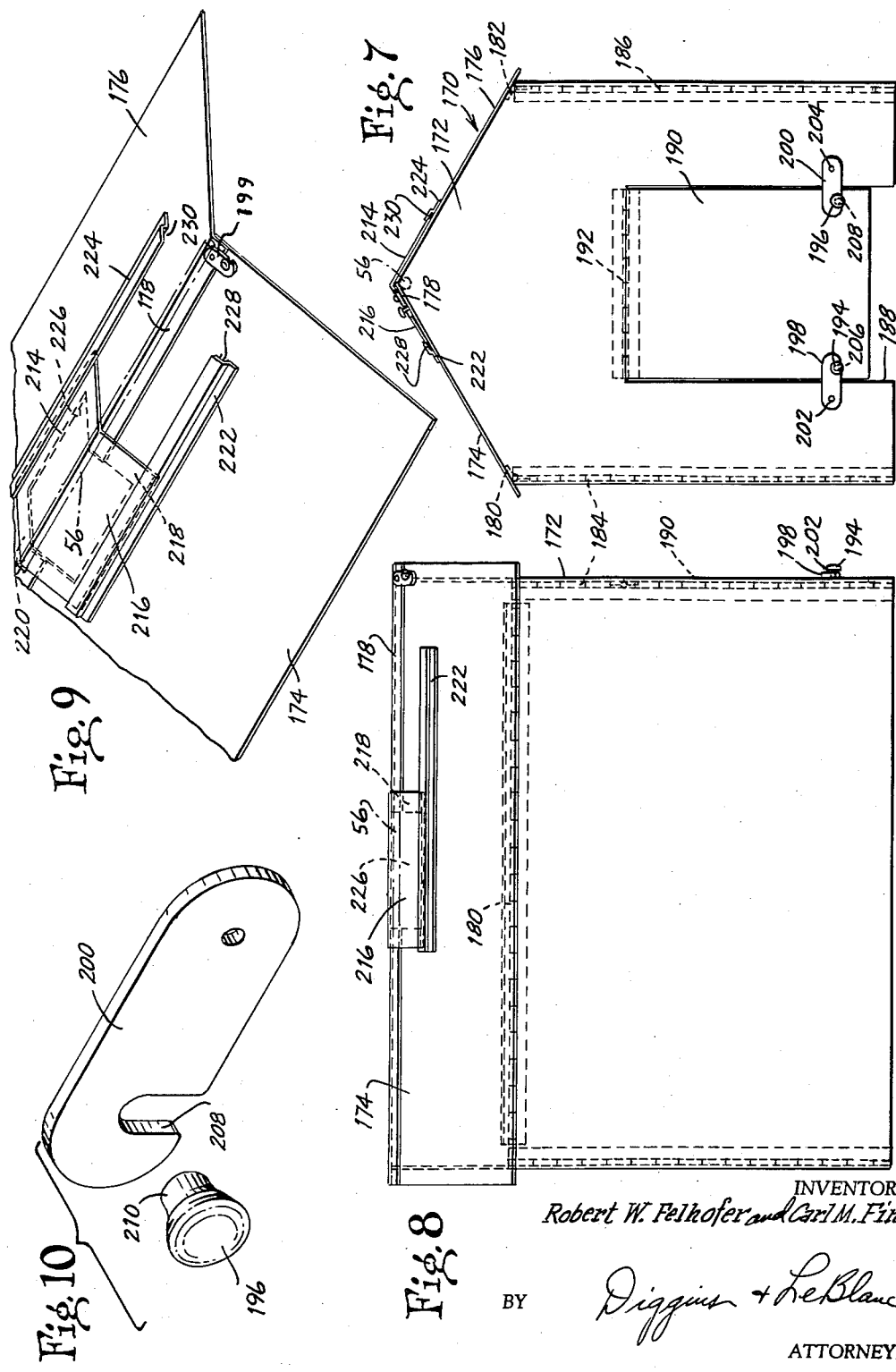

United States Patent Office 3,043,264
Patented July 10, 1962

3,043,264
COLLAPSIBLE PET HOUSE AND CARRYING CASE
Robert W. Felhofer, 4925 W. Concordia Ave., Milwaukee 16, Wis., and Carl M. Fink, 501 N. Grandview Ave., Daytona Beach, Fla.
Filed Sept. 24, 1959, Ser. No. 842,031
11 Claims. (Cl. 119—19)

This invention relates to a knock-down or collapsible structure and more particularly to a foldable pet house and carrying case constituting either a permanent home or a readily transportable conveyance for animals and particularly for domestic animals such as dogs, cats and the like.

While various pet houses and carrying cases have been proposed all suffer from one or more serious disadvantages in that the devices are not easily collapsed, are relatively expensive to manufacture, are often rather heavy and bulky to handle or do not exhibit sufficient strength and rigidity to constitute a permanent home for animals.

The present invention provides a novel combination pet house and carrying case in the form of a folding framework adapted to be enclosed by a separate cover to form a substantially improved structure of increased strength and rigidity.

The folding framework is a self contained unit with no loose parts or members and all elements are pre-assembled and fastened to each other for immediate unfolding and use. A separate cover may be provided made of canvas or plastic as well as a combination of these two materials or if desired may be made from a light weight metal such as aluminum. The cover is simply unfolded and dropped over the framework making the pet house available for immediate occupancy.

The novel pet house of the present invention includes tabs at the bottom of the corner posts adapted to receive screws, nails, bolts, rods or the like so that the pet house may be fastened securely in wood, concrete, earth, steel or similar structures to make the pet house a stationary, permanent or semi-permanent animal home if so desired. The complete unit including framework and covering is light in weight, portable, compactly and easily stored, durable, rust-proof, fire-proof, sanitary and easily cleaned.

The complete unit, that is the framework and covering, may be easily moved for use outside, in a basement, in a garage, in a breeze way or wherever desired depending upon various climates and weather conditions. The unit requires a minimum of space and is easily transported either when folded or unfolded. The unit may be collapsed and placed in an auto trunk, in an auto roof carrier, in a trailer or in similar relatively small compartments.

It is therefore a primary object of the pesent invention to provide a novel collapsible pet house and carrying case.

Another object of the present invention is to provide a novel collapsible structure of increased strength and rigidity.

Another object of the present invention is to provide a knock-down pet home of light weight and extreme versatility.

Another object of the present invention is to provide a novel cover member for a collapsible framework.

These and further objects and advantages of the invention will be more apparent upon reference to the following specification, claims and appended drawings wherein:

FIGURE 1 is a perspective view of the novel combination pet house and carrying case of the present invention as assembled and ready for use;

FIGURE 2 is a perspective view of the collapsible framework of the pet house shown in FIGURE 1;

FIGURE 3 is a elevational view of the forward or front portion of the framework shown in FIGURE 2;

FIGURE 4 is a cross section of the front end of the framework shown in FIGURE 3 taken along line 4—4 thereof;

FIGURE 5 is a perspective view of the rear portion of the framework of the pet house of FIGURE 1 with the cover removed;

FIGURE 6 is a showing similar to FIGURE 5 with the framework partially collapsed;

FIGURES 7 and 8 are front and side elevations respectively of a modified cover for the pet house of FIGURE 1;

FIGURE 9 is an enlarged view of a portion of the top of the cover shown in FIGURES 7 and 8; and FIGURE 10 is an enlarged view of the flap fastening means shown in FIGURE 7.

Referring to the drawings and more particularly to FIGURES 1 and 2, the novel combination collapsible pet house and carrying case of the present invention generally indicated at 10 comprises a framework 12 surrounded by a canvas cover 14.

While the cover 14 is described as made of canvas material it will be understood that the cover may also be made of suitable plastic material or from a combination of canvas and plastic material if so desired. The material of cover 14 is preferably completely water-proof so as to protect the interior of the structure fom the elements.

The framework 12 comprises four vertical corner posts including rear corner posts 16 and 18 and front corner posts 20 and 22. The corner posts are peferably constructed in the form of vertical angle irons and each terminate in an outwardly extending horizontal tab indicated at 24 formed integral with the corner post and provided with a suitable aperture 26 by means of which the entire pet house may be secured to a foundation such as the earth, concrete, wood, metal or the like to form a permanent or semi-permanent animal home.

Rigidly secured between the front corner post 20 and the rear corner post 18 are a pair of side braces 28 and 30 riveted together at 32 to form an X-type rigid reinforcement for the corner post. Similar bracing members join the front and rear corner posts 22 and 16 in the same manner on the opposite side of the framework.

Joining the rear corner posts 16 and 18 are a pair of rafters 34 and 36 in the form of angle irons which rafters are suitably fastened together by pins or rivets at their junction indicated at 38 so as to be free to pivot about the pin or rivet joining them at 38. Such a pin is indicated at 40 as joining the rafters 42 and 44 connecting the front corner posts 22 and 24 in a similar manner.

Depending from the junction of the rafters just described, are a pair of identical hanger members comprising rear hanger member 46 and forward hanger 48 having similar elongated slots 50 and 52 extending from adjacent the lower end of the hanger members upwardly approximately ¾ of the total length of these members. The forward rafters and front hanger member 48 are best seen in FIGURES 3 and 4.

As can be seen in FIGURES 3 and 4, the hanger member 48 receives pin 40 at its upper end which pin constitutes the extreme end of the central pet house rod 56 forming the center, upper brace member for the roof of the pet house. The end of the rod 56 formed by pin 40 is riveted at 58 about a retaining washer 60.

The lower end of hanger 48 receives a pair of spaced rivets 62 and 64 the upper rivet 62 being slidable in the slot 52. Pivoted at their extreme ends to the rivet 62 are a pair of forward joists 66 and 68 which are pivoted at their opposite ends to rivets 70 and 72 which join the front rafters to the front corner posts 20 and 22. Pivoted to rivet 64 are the inner ends of a pair of end braces 74 and 76 which, in turn, are pivoted at their outer ends to a pair of rivets 78 and 80 passing through the forward flange of the front corner posts 20 and 22 respectively.

Connecting the front corner post 20 and the rear corner post 18 is a sill 82 in the form of an angle iron having an inwardly turned horizontal flange 86 as seen in FIGURES 3 and 4, extending underneath the left-hand section 84 of the pet house floor 90. The floor 90 also includes a right-hand section 88. The two floor sections are hinged together at 92 where their respective inner vertical flanges indicated at 94 and 96 in FIGURE 3 are joined by the hinge 92. Right-hand floor section 88 includes an overhanging portion 100 which overhangs the upper surface of left-hand section 84 and extends along the entire length of the floor. Secured by spaced rivets 102 and 104 to the front edge of the left-hand floor section 84 is a floor brace 106 having an inwardly extending turned over tab 108 adapted to bear on the upper surface of right-hand section 88 when the pet house is assembled as shown. It is apparent that when the structure is collapsed, the floor sections including spaced hinges 92 move upwardly at the center of the pet house and that floor brace 106 rigidly secured to the front edge of section 84 moves with this section with tab 108 far enough to the right to easily clear right-hand section 88 in its upwardly movement.

The right-hand corner posts 16 and 22 are similarly joined by a sill 112 and the rear portion of the framework includes rear joists 114 and 116 as well as rear end braces 118 and 120 all constructed in a manner identical to that described with respect to the front end of the framework. In addition, the rear end of the framework includes a floor hanger 122 joined to the hanger element 46 at the extreme lower end of the latter.

The cover 14 as best seen in FIGURE 1 is provided with a rectangular aperture 124 in its front wall or face 126 which aperture provides an entrance and exit space for an animal housed within the interior of the structure. The cover 14 is further provided with a flap 128 adapted to drop over the aperture 24 and close off the entrance to the pet house 10. Flap 128 is provided with a plurality of fasteners 130 along each vertical edge which cooperate with mating fastener means 132 along each edge of the entrance 124 to securely fasten the flap in place over the entrance.

A similar flap 134 is provided in the roof 136 of the covering 14 which when pulled back in the manner illustrated in FIGURE 1 exposes the center rod 56 of the framework 12. The aperture 138 which flap 134 is adapted close off is made to extend far enough on either side of rod 56 to permit a hand to be inserted into the aperture to securely grasp the rod 56 for the purpose of lifting and carrying the entire pet house 10. Flap 134 is provided with a series of fasteners 140 which cooperate with mating fasteners 142 alongside aperture 138 on the roof 136 to securely and tightly fasten the flap 140 in position so as to completely close the pet house against rain and other elements.

The cover 14 also includes a pair of straps which extend from one side of the cover completely underneath the frame 12 and are fastened by suitable snap fasteners to the opposite sides of the cover. The ends of these straps are indicated in FIGURE 1 at 146 and 148 and are fastened to the side wall 150 of the cover. The straps pass completely underneath the framework and are permanently secured to the opposite cover wall. If desired a U-shaped, circular cross-section rod 152 may be inserted into a hem formed around the entire bottom periphery of the cover so as to shape the cover for dropping it over the framework. The rod 152 is indicated as extending completely across the entrance 124 and into a suitable hem provided at the bottom of the cover 14 around the corners 154 and 156 and terminates a short distance from the front face 126, as indicated in dotted lines, for example at 158. A similar U-shaped rod may be inserted in the hem at the rear of the cover and the extreme end portion of this rear rod is indicated by dotted lines at 160. These front and rear rods inserted in the hemming along the lower edge of the cover provide a sufficient stiffness and shape to the cover so that it may be easily slipped over the framework and easily removed when so desired.

FIGURES 5 and 6 illustrate the closing action of the framework showing in perspective the rear end of the framework fully opened in FIGURE 5 and partially collapsed in FIGURE 6. It will be understood that the description of the closing of the rear portion of the framework is equally applicable to the front end of the framework as well with the exception that the floor hanger 122 is simply omitted from the front end. The closing of only a single end of the framework is shown to an enlarged scale in FIGURES 5 and 6 so that the collapsing of the framework will be more fully understood.

As can be seen when fully opened the joists 114 and 116 are substantially horizontal and terminate at the lower end of slot 52 in hanger element 46 as seen in FIGURE 5. However, the pin to which these elements are secured is adapted to slide upwardly in the slot 52 as clearly shown in FIGURE 6. The end braces 118 and 120 are free to pivot at both ends as are the rafters 34 and 36. The lower end of floor hanger 122 is pivoted to the end flange of floor section 84 so that the entire center member comprising floor hanger 122 and hanger element 46 moves upwardly along with the center of floor sections 84. At the same time the three sets of outwardly extending brace members merely fold inwardly with the junction of the joist moving upwardly in the slot 52. While only a partial collapsed structure is shown in FIGURE 6 it will be understood that the entire assembly comes together to form a substantially flat structure with the end posts 18 and 22 in contact with each other. The floor sections 84 and 86 are hinged to the sills 82 and 112 respectively as indicated by dotted lines at 164 and 166 so that the floor sections may be raised at the center to pivot about their extreme outer edges.

FIGURES 7 through 10 illustrate a modified covering for the framework of FIGURE 2 formed from rigid light weight metal such as aluminum. The aluminum cover generally indicated at 170 includes a pair of end walls one of which is shown at 172 in FIGURE 7, which walls extend completely to the top of the cover into endwise abutment with a pair of roof sections 174 and 176. Roof section 176 is constructed to slightly overlap roof section 174 as indicated at 178 in FIGURE 7. Each of the roof sections is hinged to the side wall along its entire lower edge as indicated at 180 and 192 in FIGURE 7 and best illustrated at 180 in FIGURE 8.

The front wall 172 of the aluminum cover is hinged along each edge to the side walls as indicated at 184 and 186 and is provided with a rectangular entrance aperture 188. A door flap 190 closes off the entrance aperture 188 and is hinged to the front end of the pet house as shown at 192 along the top edge of the entrance aperture 188. All hinge connections for the aluminum cover illustrated in FIGURES 7 through 10 are preferably of the piano hinge-type which may swing in either direction so that the rigid cover may also be completely collapsed. In the case of door flap 190 the piano hinge connection at 192 permits the door flap to swing both in and out so that an animal may effect its own entrance into and exit from the pet house.

If desired the door flap may be provided with a pair of aluminum studs 194 and 196 one of which is illustrated to an enlarged scale in FIGURE 10. A pair of suitable catches 198 and 200 are pivoted to the front wall 172 at 202 and 204 and are provided with slots 206 and 208 adapted to slide over and engage the reduced neck portion 210 of the studs 194 and 196 respectively. These catches therefore act to hold the door flap securely closed when the entire unit is used as a carrying case in order to prevent an animal from opening the doorflap at such times when it would not be desirable to permit the animal's exit from the unit. A plurality of similar catches join the roof sections, one such catch being indicated at 199 in FIGURE 9.

FIGURE 9 illustrates to an enlarged scale the arrangement for providing a hand grip in the roof portion of the aluminum cover referred to as the sliding hand hold arrangement for the roof of the metallic cover. As clearly seen in FIGURE 9 a hand hold closure member 214 is folded along its center line as indicated at 216 to provide a pair of outwardly and downwardly extending flanges 218 and 220 overlapping a portion of the roof sections 174 and 176. The extreme outer edges of flanges 218 and 220 are received in sliding closure guides 222 and 224 formed in the roof sections 174 and 176 respectively, so that the lower edges of the closure 214 are securely retained between the guides 222 and 224 and the upper surfaces of the respective roof sections.

The closure 214 may be slid along the guides 222 and 224 to uncover an aperture in the roof sections indicated by dashed lines at 226 which aperture is as previously described, made large enough to provide the entrance of a hand to grip the top rod of the frame 56 also indicated by dashed lines in FIGURE 9. The opposite ends of the closure guides 228 and 230 are preferably closed off so that the closure member 214 will not slip out of the opposite ends of the guides.

By simply manually gripping the edge of the closure member 214 it is possible to slide this member to the opposite end of the guides 222 and 224 from that shown in FIGURE 9 to uncover the aperture 226. In order to remove the closure member 214 it is preferably gripped at each end adjacent the center line or crease 216 and pulled upwardly with a little force to dislodge it from the guides so that the roof sections as well as the entire remainder of the aluminum cover 170 may be completely collapsed to form a substantially planar structural unit.

It it apparent from the above that the present invention provides a novel pet house and carrying case of substantially improved light weight and yet rigid construction. While the device has been described as suitable for carrying animals it will be understood that the enclosure may be readily adapted for housing any other desired objects or for transporting other objects if so desired. The complete collapsibility of both the framework and either the canvas or metallic covers makes it possible to completely flatten the entire unit so that it may be easily stored or carried in the trunk or roof carrier of an automobile. The unit is extremely versatile and may be moved about and placed at any desired location and further may be securely fixed to a base surface such as the earth, concrete or the like.

In the preferred construction, the entire structural assembly shown in FIGURE 2 is made from light weight aluminum. The cover may be made of canvas, plastic, a combination of these two materials or of aluminum as described. It will be apparent that other materials such as other metals or wood or its equivalent may also be employed to form the pet house of the present invention.

The folding framework is a strong self-contained unit possessing extreme rigidity when fully assembled and contains no parts which may work loose since all members are preassembled and fastened together for immediate folding and unfolding. The unit may be simply and easily manufactured, is light weight, durable and when made of aluminum is completely rust-proof and vermin proof. Ready access may be had to the entire unit by simple removal of the cover to easily clean the unit to maintain completely sanitary conditions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An animal enclosure comprising a collapsible framework including a pair of rigid side frames, front and rear rafters pivotally joined to said side frames, hanger members depending from said front and rear rafters, said hanger members slidably receiving a pivot pin, front and rear joists pivoted at their outer ends to said frames and at their inner ends to said pin, and a removable cover surrounding said framework.

2. An animal enclosure according to claim 1 including a pair of overlapping floor sections each pivoted along its outer edge to the lower end of one of said side frames.

3. A collapsible pet house and carrying case comprising a framework including a pair of rigid side frames, front and rear rafters pivotally joined to said side frames and to each other, front and rear hanger members depending from the junctions of said front and rear rafters, said hanger members each slidably receiving a pivot pin movable over a greater portion of the length of said hanger members, front and rear joists pivoted at their outer ends to said frames and joined at their inner ends to said pivot pin, front and rear end braces pivoted at their outer ends to said frames and at their inner ends to the lower ends of said hanger members, a pair of overlapping floor sections each pivoted along its outer edge to the lower end of one of said side frames, and a removable cover surrounding said framework.

4. A collapsible pet house and carrying case according to claim 3 wherein said pivot pins are slidably received in elongated slots formed in said hanger members and extending upwardly from adjacent the lower ends thereof.

5. A collapsible pet house and carrying case according to claim 4 including a rod connecting the junctions of said front and rear rafters, said cover including an aperture providing access for a hand to grip said rod and carry said framework and cover.

6. A collapsible pet house and carrying case according to claim 5 wherein said side frames include vertical corner posts, each corner post including a horizontal tab at its lower end for securing said framework to a base.

7. A collapsible pet house and carrying case according to claim 6 wherein said framework is made of aluminum.

8. A collapsible pet house and carrying case according to claim 6 wherein said cover is made of canvas and includes an entrance aperture and a closing flap secured over said aperture by snap fasteners.

9. A collapsible pet house and carrying case according to claim 8 wherein said cover is formed with a hem at its lower edge and is provided with stiffeners received in said hem.

10. A collapsible pet house and carrying case according to claim 6 wherein said cover is made of aluminum and is collapsible.

11. A collapsible pet house and carrying case according to claim 10 wherein said cover includes an entrance aperture closed off by a flap secured to the top of said entrance aperture by piano hinges.

References Cited in the file of this patent

UNITED STATES PATENTS

| | | |
|---|---|---|
| 1,305,306 | Rasmussen | June 3, 1919 |
| 2,409,598 | Swazey | Oct. 15, 1946 |
| 2,478,883 | Willis et al. | Aug. 9, 1949 |
| 2,538,778 | Halpin | Jan. 23, 1951 |
| 2,771,896 | Call | Nov. 27, 1956 |
| 2,850,027 | Smith | Sept. 2, 1958 |